US011987015B2

(12) United States Patent
Hafenrichter et al.

(10) Patent No.: US 11,987,015 B2
(45) Date of Patent: *May 21, 2024

(54) SYSTEMS AND METHODS FOR EVACUATED INJECTION REPAIR OF BONDLINE VOIDS

(71) Applicant: The Boeing Company, Chicago, IL (US)

(72) Inventors: Joseph L. Hafenrichter, Chicago, IL (US); Gary E. Georgeson, Chicago, IL (US); Marc J. Piehl, Chicago, IL (US)

(73) Assignee: The Boeing Company, Arlington, VA (US)

( * ) Notice: Subject to any disclaimer, the term of this patent is extended or adjusted under 35 U.S.C. 154(b) by 120 days.

This patent is subject to a terminal disclaimer.

(21) Appl. No.: 17/551,320

(22) Filed: Dec. 15, 2021

(65) Prior Publication Data
US 2022/0194031 A1    Jun. 23, 2022

Related U.S. Application Data

(60) Provisional application No. 63/126,914, filed on Dec. 17, 2020.

(51) Int. Cl.
B29C 73/02    (2006.01)
B29C 73/24    (2006.01)
B29L 31/30    (2006.01)

(52) U.S. Cl.
CPC ............ *B29C 73/025* (2013.01); *B29C 73/24* (2013.01); *B29L 2031/3085* (2013.01)

(58) Field of Classification Search
None
See application file for complete search history.

(56) References Cited

U.S. PATENT DOCUMENTS

| 2006/0243382 A1 | 11/2006 | Kilwin et al. |
| 2011/0209347 A1 | 9/2011 | Deak et al. |
| 2021/0316837 A1 | 10/2021 | Hafenrichter et al. |

OTHER PUBLICATIONS

United States Patent Application Serial No. , filed Dec. 15, 2021, entitled "Systems And Methods For Adhesive-Injected Patch Repair".
United States Patent Application Serial No. , filed Dec. 15, 2021, entitled "Systems And Methods For Sealing A Bond Cavity Between Structural Components".
Extended European Search Report prepared by the European Patent Office in application No. EP 21 21 0870.8 dated May 30, 2022.

*Primary Examiner* — Barbara J Musser
(74) *Attorney, Agent, or Firm* — McDonnell Boehnen Hulbert & Berghoff LLP

(57) ABSTRACT

In an example, a method is described. The method comprises forming a single hole into a bond gap repair area. The method also comprises evacuating, via an adhesive injection apparatus attached to the single hole, the bond gap repair area and an injection channel of the adhesive injection apparatus. The method also comprises forcing adhesive through the evacuated injection channel and into the evacuated bond gap repair area.

20 Claims, 15 Drawing Sheets

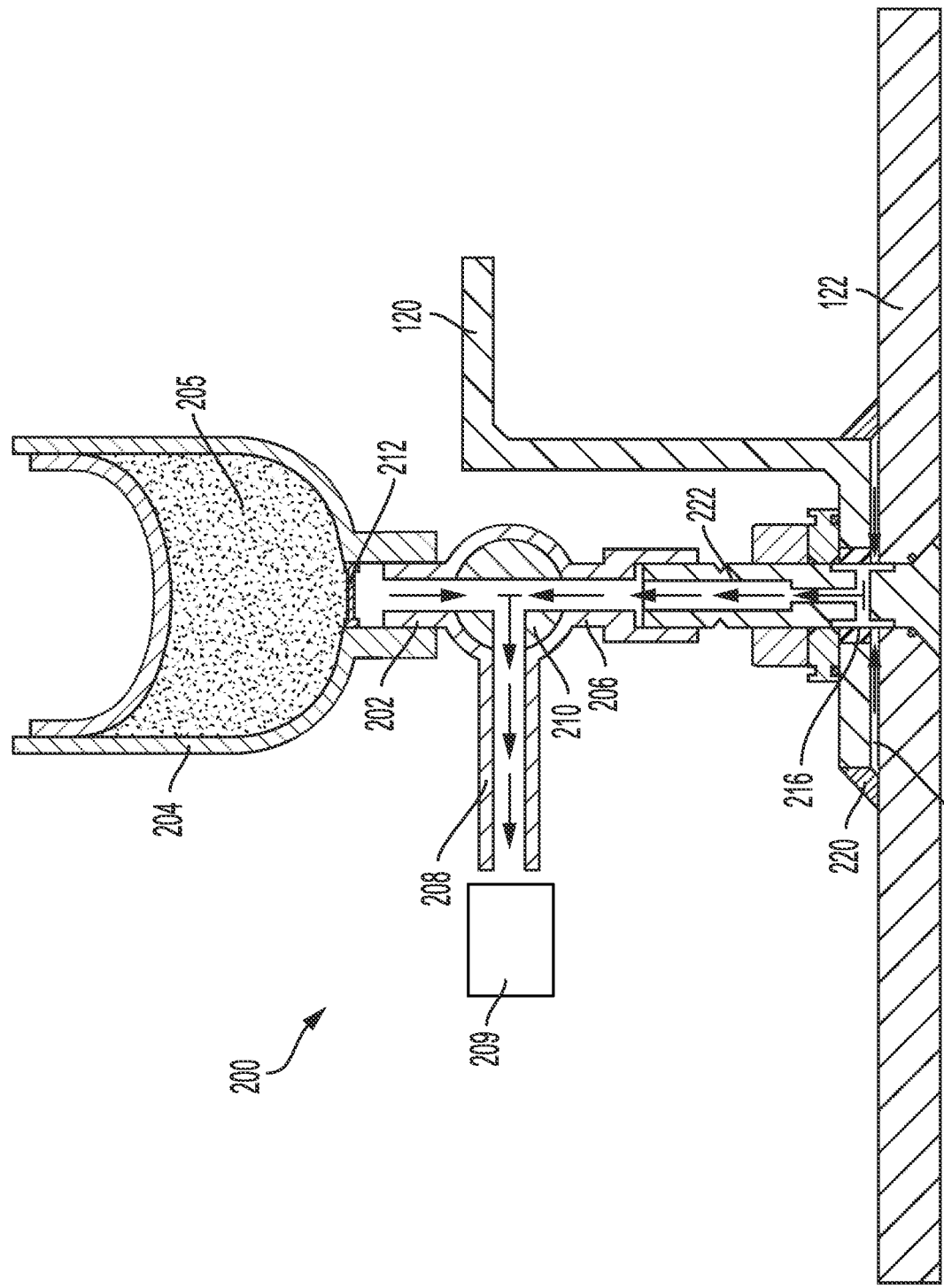

AFTER FORCING THE ADHESIVE THROUGH THE EVACUATED INJECTION CHANNEL AND INTO THE EVACUATED BOND GAP REPAIR AREA:

DETACHING THE ADHESIVE INJECTION APPARATUS FROM THE SINGLE HOLE; AND

REMOVING A REMAINING PORTION OF THE ADHESIVE PROTRUDING FROM THE SINGLE HOLE ⟵ 532

FIG. 17

CURING THE ADHESIVE TO FORM A BONDLINE IN THE BOND GAP REPAIR AREA ⟵ 534

FORMING A SINGLE HOLE INTO A BOND GAP AREA ⟵ 602

EVACUATING, VIA AN ADHESIVE INJECTION APPARATUS ATTACHED TO THE SINGLE HOLE, THE BOND GAP AREA AND AN INJECTION CHANNEL OF THE ADHESIVE INJECTION APPARATUS ⟵ 604

FORCING ADHESIVE THROUGH THE EVACUATED INJECTION CHANNEL AND INTO THE EVACUATED BOND GAP AREA ⟵ 606

FIG. 19

PLACING A SEALANT BEAD AROUND A PERIMETER OF THE FIRST STRUCTURE TO SEAL THE BOND GAP AREA ⟵ 608

FIG. 20

SYSTEMS AND METHODS FOR EVACUATED INJECTION REPAIR OF BONDLINE VOIDS

CROSS-REFERENCE TO RELATED APPLICATIONS

The present disclosure claims priority to U.S. Provisional Application No. 63/126,914, filed on Dec. 17, 2020, the entire contents of which are herein incorporated by reference.

FIELD

The present disclosure relates generally to bonding structural components, and more particularly, to injecting an adhesive in a bondline void between structural components.

BACKGROUND

In aircraft and other environments, adhesive is often placed between structural components (e.g., composite structures) to bond such structures together. In some situations, however, the adhesive might not be uniformly distributed between the structures, thus creating a structural weakness between the two structures in the form of a bondline void.

Existing techniques for repairing bondline voids involve forming (e.g., drilling) two or more holes in one of the structures to access and repair the void. For example, the adhesive is injected into the void through at least one hole in the structure and an additional one or more holes is/are used for discharging air or the adhesive from the void. These existing repair techniques also typically require the use of non-destructive inspection to map out the void area and to determine where the holes should be formed. The multiple holes are typically formed at selected locations near the edge of the void area and on opposite sides of the void area after the void area is mapped out using non-destructive inspection.

However, these existing repair techniques can be time consuming and can require large amounts of factory floor space. For example, selecting the locations of the multiple holes can be a complex and difficult process. Further, forming multiple holes in each of the structures to be repaired can take longer than desired. Still further, as adhesive is injected using these existing repair techniques, air can become trapped in the void, thus creating residual voids that remain after the repair is complete. For example, air can become trapped in a corner of the void that is not near one of the multiple holes, thus creating a residual void. Such residual voids can reduce the structural capacity of the repaired bondline or otherwise result in an undesirable bondline. Thus, additional time and labor must often be spent to re-inspect structures to detect and repair the residual voids.

Thus, what is needed is a less time consuming, less labor intensive, and more reliable technique for producing high-quality bondlines when bonding structures. Further, what is needed is a less time consuming, less labor intensive, and more reliable technique for repairing bondline voids.

SUMMARY

In an example, a method is described. The method comprises forming a single hole into a bond gap repair area. The method also comprises evacuating, via an adhesive injection apparatus attached to the single hole, the bond gap repair area and an injection channel of the adhesive injection apparatus. The method also comprises forcing adhesive through the evacuated injection channel and into the evacuated bond gap repair area.

In another example, an adhesive injection apparatus is described. The adhesive injection apparatus comprises a transfer channel configured to be fluidly coupled to an adhesive reservoir. The adhesive injection apparatus also comprises an injection channel configured to be fluidly coupled to a bond gap repair area. The adhesive injection apparatus also comprises an evacuation channel configured to be fluidly coupled to a vacuum source. The adhesive injection apparatus also comprises a three-way valve disposed between the transfer channel, the injection channel, and the evacuation channel and selectively operable to establish fluid communication between the evacuation channel and the injection channel, between the evacuation channel and the transfer channel, and between the transfer channel and the injection channel.

In another example, a method is described. The method comprises forming a single hole into a bond gap area. The method also comprises evacuating, via an adhesive injection apparatus attached to the single hole, the bond gap area and an injection channel of the adhesive injection apparatus. The method also comprises forcing adhesive through the evacuated injection channel and into the evacuated bond gap area.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 4 illustrates an example stage of a process in which an adhesive is injected in a bond gap area between structural components, where a sealant bead defines a perimeter of the bond gap area, according to an example implementation.

FIG. 17 shows a flowchart of an example method for use with the method of FIG. 5, according to an example implementation.

FIG. 18 shows a flowchart of an example method for use with the method of FIG. 17, according to an example implementation.

FIG. 19 shows a flowchart of another example method for filling a bond gap area with adhesive, according to an example implementation.

FIG. 20 shows a flowchart of an example method for use with the method of FIG. 19, according to an example implementation.

DETAILED DESCRIPTION

Figure 1:
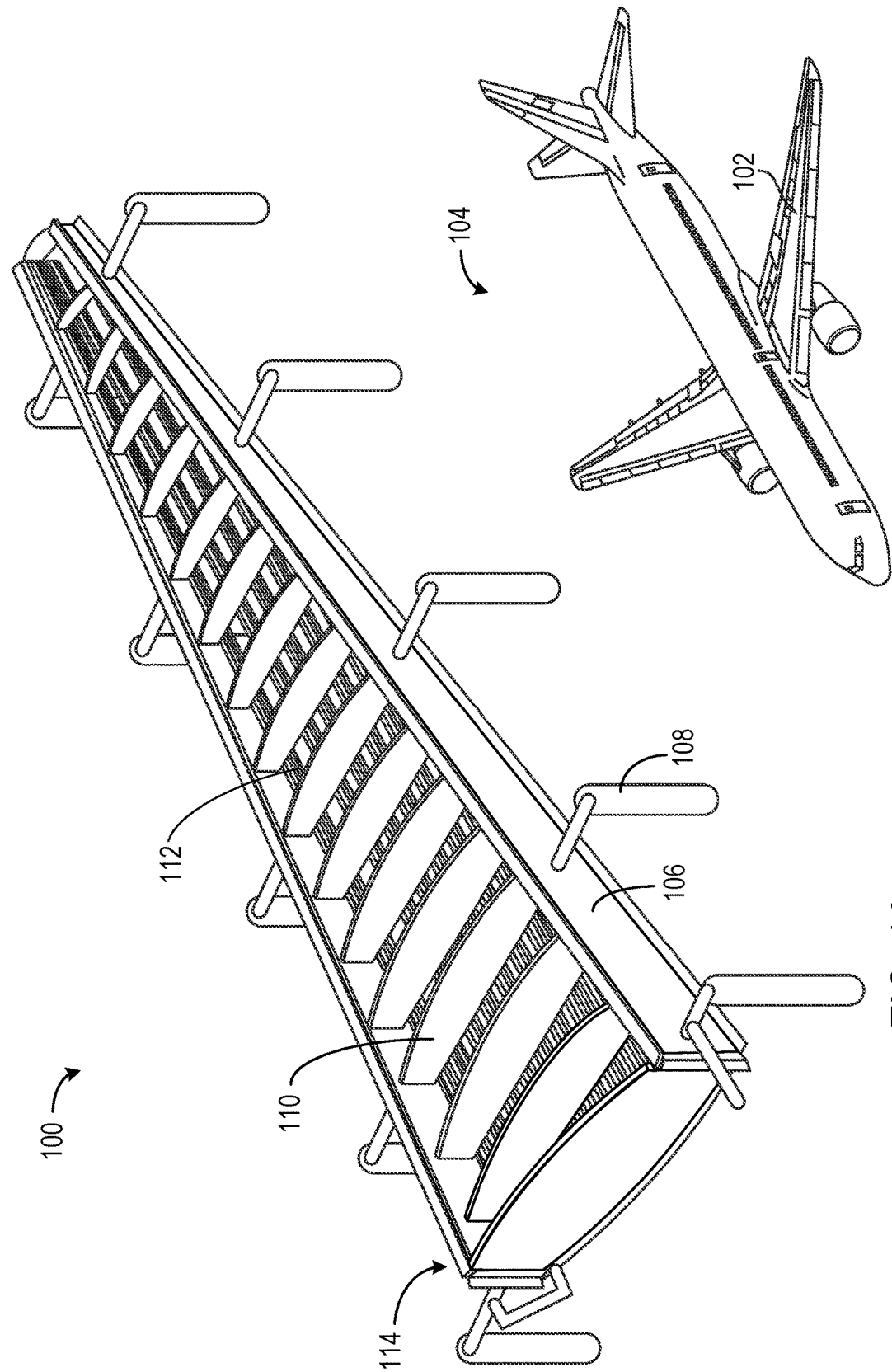
FIG. 1A illustrates a system for forming a bonded wing of an aircraft, according to an example implementation.
FIG. 1B illustrates an example of the aircraft including the bonded wing, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

By the terms "substantially," "about," "approximately," and "proximate" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Unless otherwise specifically noted, elements depicted in the drawings are not necessarily drawn to scale.

The disclosed methods and systems will be primarily discussed in the context of bonded structures of an aircraft (e.g., stringers and skins), but the disclosed methods and systems can also implemented with respect to other types of bonded structures as well, in environments other than aircrafts. In the context of aircrafts, the disclosed methods and systems can be used during the production of the aircraft, such as during the production of bonded structures (e.g., a bonded wing of the aircraft). Additionally or alternatively, the disclosed methods and systems can be used during structural maintenance of aircraft structures, such as to address structure damage to a wing or other component of the aircraft, for instance.

Within examples, described herein are methods for injecting adhesive in a bond gap repair area between two bonded structures (i.e., a first structure bonded to a second structure), particularly by evacuating the bond gap repair area via a single hole and injecting adhesive into the bond gap repair area via that same hole. In addition, described herein is an adhesive injection apparatus for use in repairing the bond gap repair area in accordance with the disclosed methods. The disclosed methods and adhesive injection apparatus are used in the context of repairing a bondline void. The disclosed methods and adhesive injection apparatus are also used for purposes other than repairing bondline voids. For example, after two structures are fastened together and the edges where those structures mate are sealed (e.g., with caulk), the disclosed methods and adhesive injection apparatus can be used to fill the resulting bond gap area with adhesive and create a desirable, strong bondline.

Within examples, a single hole is formed into a bond gap repair area and an adhesive injection apparatus is attached to the single hole. The single hole can be formed in one of the two structures or created in some other manner that provides access to the bond gap repair area. The bond gap repair area and an injection channel of the adhesive injection apparatus are then evacuated via the adhesive injection apparatus. Once the bond gap repair area and the injection channel of the adhesive injection apparatus are evacuated, adhesive is forced through the evacuated injection channel and into the evacuated bond gap repair area.

To facilitate this process, the adhesive injection apparatus includes three channels and a three-way valve. In particular, the adhesive injection apparatus includes a transfer channel configured to be fluidly coupled to an adhesive reservoir, an injection channel configured to be fluidly coupled to the bond gap repair area, and an evacuation channel configured to be fluidly coupled to a vacuum source. The three-way valve is disposed between the transfer channel, the injection channel, and the evacuation channel and selectively operable to establish fluid communication between the evacuation channel and the injection channel, between the evacuation channel and the transfer channel, and between the transfer channel and the injection channel.

To evacuate the bond gap repair area, the three-way valve is positioned to establish fluid communication between the evacuation channel and the injection channel and the vacuum source is used to remove air from the bond gap repair area before adhesive is injected. The three-way valve is then positioned to establish fluid communication between the evacuation channel and the transfer channel and the vacuum source is used to remove air from the transfer channel. The three-way valve is then positioned to establish fluid communication between the transfer channel and the injection channel and the adhesive is forced out of the adhesive reservoir, through the transfer channel and the injection channel, and into the bond gap repair area.

With the air removed from the transfer channel and the bond gap repair area before the adhesive is injected, there can be fewer air molecules or no air molecules in the transfer channel and the bond gap repair area to resist the adhesive filling the bond gap repair area. As a result, the frequency of residual voids appearing in the bond gap repair area can be reduced, which can reduce or eliminate the need for spending additional time and labor on re-inspecting and re-repairing the bonded structures. Thus, the disclosed methods and apparatus can efficiently create a desirable bondline with a desirable structural capacity. Furthermore, the use of a single hole as opposed to multiple holes can reduce the amount of time and labor spent preparing for filling a bond gap or for bondline repair. In addition, the adhesive injection apparatus can act as a single device used for both evacuation and injection, which can reduce or eliminate the need for additional, separate devices for performing the evacuation and injection.

The disclosed methods for repairing bondline voids are less time consuming, less labor intensive, and more reliable than conventional repair techniques for bondline voids and can help enable high-rate production of bonded structures.

These and other improvements are described in more detail below. Implementations described below are for purposes of example. The implementations described below, as well as other implementations, may provide other improvements as well.

FIG. 1A illustrates a system 100 for forming a bonded wing 102 of an aircraft 104, according to an example implementation. FIG. 1B illustrates an example of the aircraft 104 including the bonded wing 102.

The system 100 includes a plurality of spars 106, which are held in place by a plurality of fixture arms 108. The plurality of fixture arms 108 are not included in the assembled wing, but are rather provided for purposes of assembly. Other fixtures or tools can be used for holding aspects of the system 100 in place during assembly. The system 100 further includes a plurality of wing ribs 110, which are attached between the spars 106. The system 100 further includes a plurality of longerons 112 (also known as "stringers", in some examples), which run parallel to the spars 106, and which provide an interface between the wing ribs 110 and other aspects of the system 100. The longerons 112 may provide a flexibility and strength to the system 100.

The spars 106 can collectively form a portion of a wing box 114 that provides lateral structure to the system 100, and which provides a general shape and dimension of the system 100. Further, additional components of the system 100 may couple to the wing box 114. Accordingly, the dimensions of the spars 106 may strictly adhere to design plans for the wing 102. For similar reasons, holes in the spars 106 may be close tolerance holes, and therefore can fit the corresponding fasteners in accordance with a given accuracy level (e.g., within 1% of the diameter of the fastener).

Figure 2:
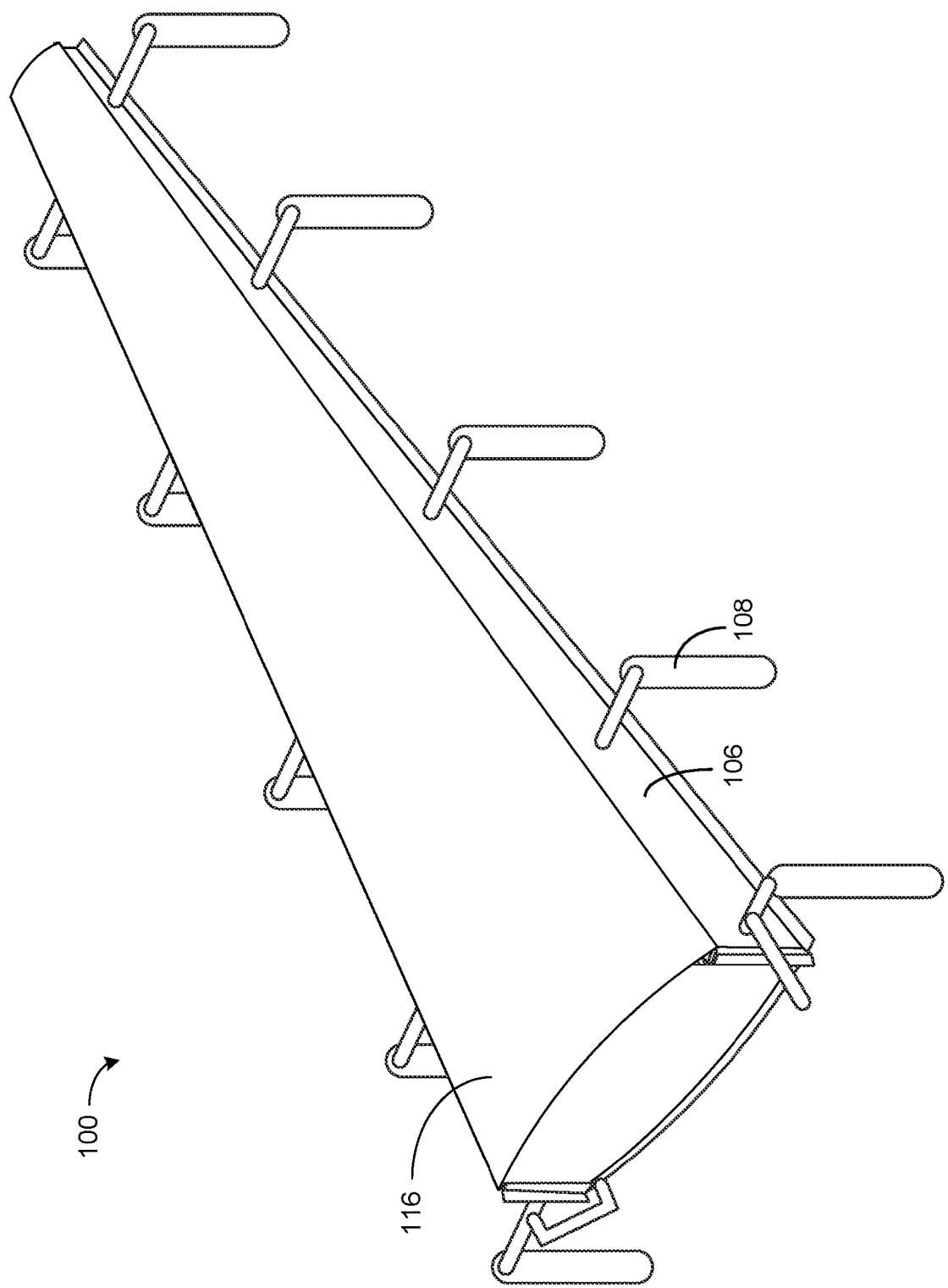
FIG. 2 illustrates the system with a portion of a wing skin coupled or bonded to the spars, the wing ribs, and the longerons, according to an example implementation.

FIG. 2 illustrates the system 100 with a portion of a wing skin 116 coupled or bonded to the spars 106, the wing ribs 110, and the longerons 112, according to an example implementation. By coupling the wing skin 116 to a component of the wing (e.g., the spars 106, the wing ribs 110, and the longerons 112), the bonded wing 102 is formed.

FIGS. 3A-3M illustrate example stages of a process to inject an adhesive in a bond gap repair area 118 between a first structure 120 and a second structure 122, according to an example implementation. FIGS. 3A-3M relate to injecting adhesive in the bond gap repair area 118 to repair a bondline void.

Figure 3A:
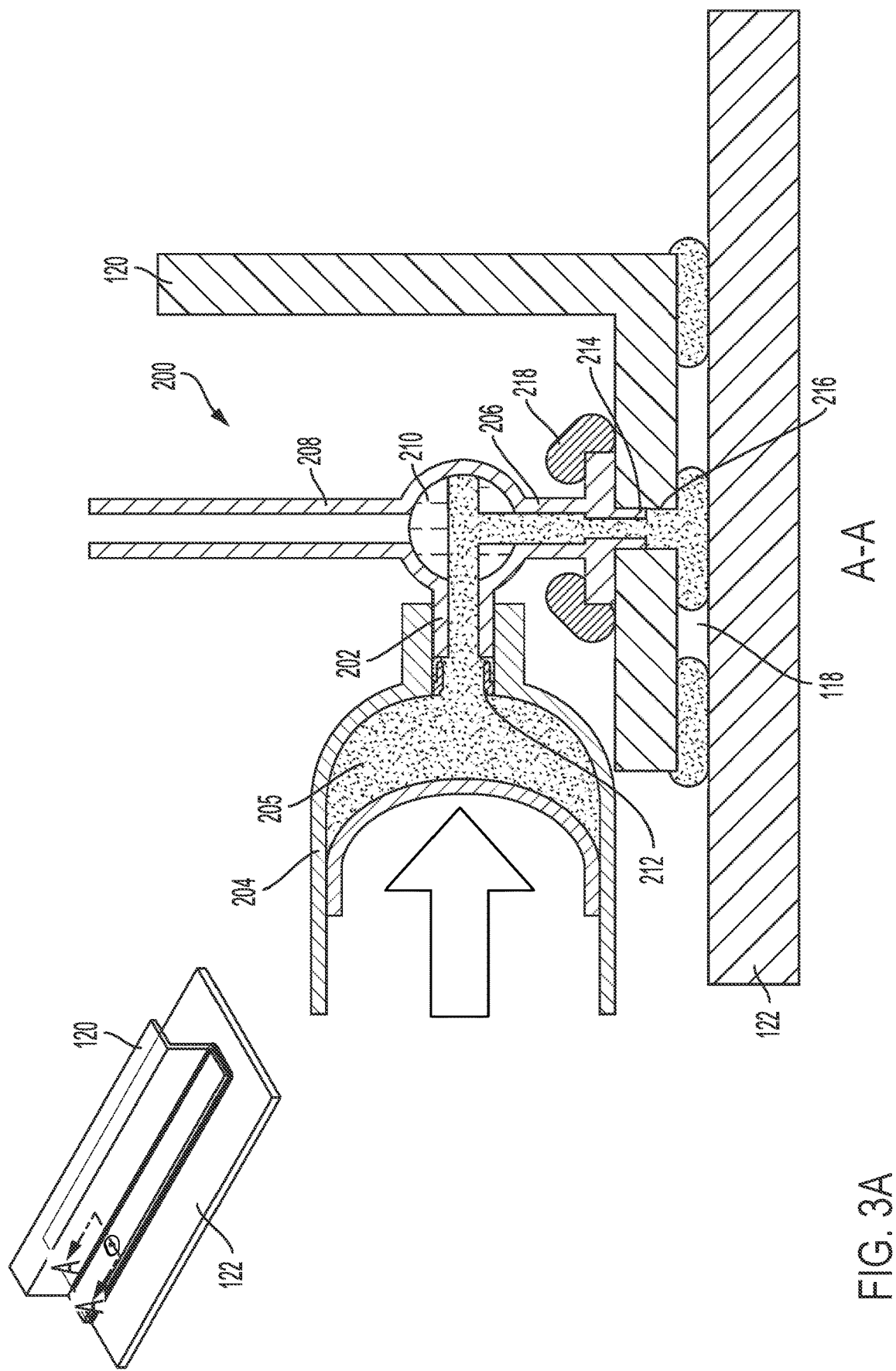
FIGS. 3A-3M illustrate example stages of a process to inject an adhesive in a bond gap repair area between structural components, according to an example implementation.

For the purpose of showing the components involved in implementing the process, FIG. 3A first illustrates a cross-sectional view of an intermediate stage of the process—namely, a stage in which adhesive is being forced into the bond gap repair area 118. In particular, FIG. 3A illustrates a cross-sectional view (taken along line A-A) of the first structure 120, the second structure 122, and an adhesive injection apparatus 200 during an intermediate stage of the repair process. FIGS. 3B-3M then illustrate the example stages of the process, beginning with an initial stage shown in FIG. 3B.

In particular, FIG. 3A illustrates the first structure 120, the second structure 122, and an adhesive injection apparatus 200. An example of the first structure 120 can include a component of the wing 102 of the aircraft 104, such as the spars 106, the wing ribs 110, or the longerons 112. Within examples, the first structure 120 can be a stringer of the aircraft 104. An example of the second structure 122 can include the wing skin 116 of the wing 102 or another structure of the aircraft 104. The first structure and the second structure can include other components of the wing 102 or other components of the aircraft 104 as well. Further, the first structure 120 and the second structure 122 can be structures in another type of vehicle or types of structures that are used in contexts other than vehicles.

The adhesive injection apparatus 200 includes a transfer channel 202 configured to be fluidly coupled to an adhesive reservoir 204 that contains adhesive 205. The adhesive injection apparatus 200 optionally includes the adhesive reservoir 204. In some examples, the adhesive 205 is a de-aerated adhesive (e.g., adhesive paste with bubbles or air evacuated), although other types of adhesive can be used in other examples.

The adhesive injection apparatus 200 also includes an injection channel 206 configured to be fluidly coupled to the bond gap repair area 118. The adhesive injection apparatus 200 also includes an evacuation channel 208 configured to be fluidly coupled to a vacuum source 209. Further, the adhesive injection apparatus 200 includes a three-way valve 210 disposed between the transfer channel 202, the injection channel 206, and the evacuation channel 208. The three-way valve 210 is selectively operable to establish fluid communication between the evacuation channel 208 and the injection channel 206, between the evacuation channel 208 and the transfer channel 202, and between the transfer channel 202 and the injection channel 206. Still further, the adhesive injection apparatus 200 includes a frangible seal 212 proximal to and separating the adhesive reservoir 204 from the transfer channel 202. The frangible seal 212 prevents air from entering the adhesive reservoir 204.

The injection channel 206 terminates in an injection tip 214 that can be inserted into a single hole 216 formed in the first structure 120, to facilitate the injection channel 206 being fluidly coupled to the bond gap repair area 118. Alternatively, the injection tip 214 can be placed over or otherwise attached to the single hole 216. Other methods and structures can be used in alternative examples for fluidly coupling the adhesive injection apparatus 200 to the bond gap repair area 118.

The single hole 216 can be drilled or otherwise formed through the first structure 120. As noted above, the single hole 216 is used for both evacuating the bond gap repair area 118 and forcing the adhesive 205 into the bond gap repair area 118. In alternative examples, the single hole 216 can be formed into the bond gap repair area 118 in other ways, such as by forming the single hole 216 in the second structure 122 instead of in the first structure 120. And in other alternative examples, the single hole 216 can be formed in the adhesive, sealant, or other material that defines a perimeter of the bond gap repair area 118.

As further shown in FIG. 3A, vacuum seal tape 218 can be optionally used to attach the adhesive injection apparatus 200 to the single hole 216. The vacuum seal tape 218 can provide additional help in facilitating evacuating all the air from the bond gap repair area 118. In an example, the vacuum seal tape 218 is attached before evacuating the bond gap repair area 118 and the injection channel 206.

Figure 3B:
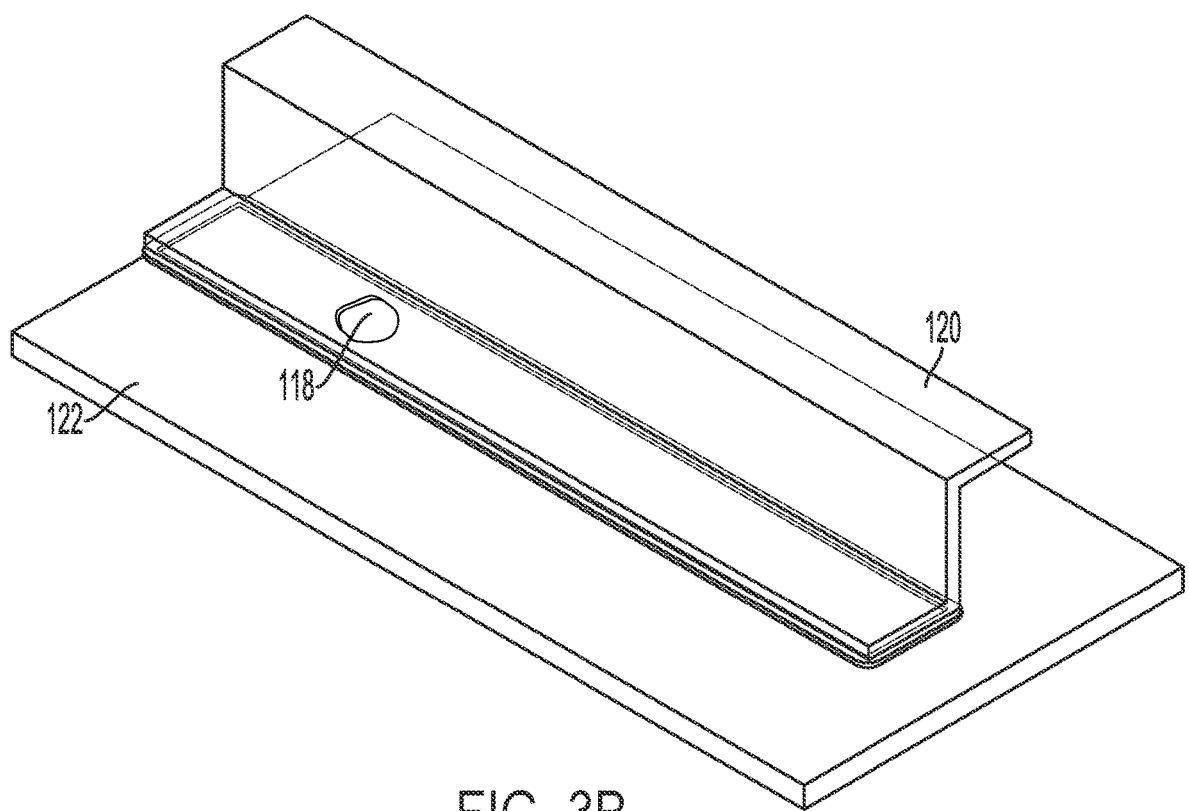
Figure 3C:
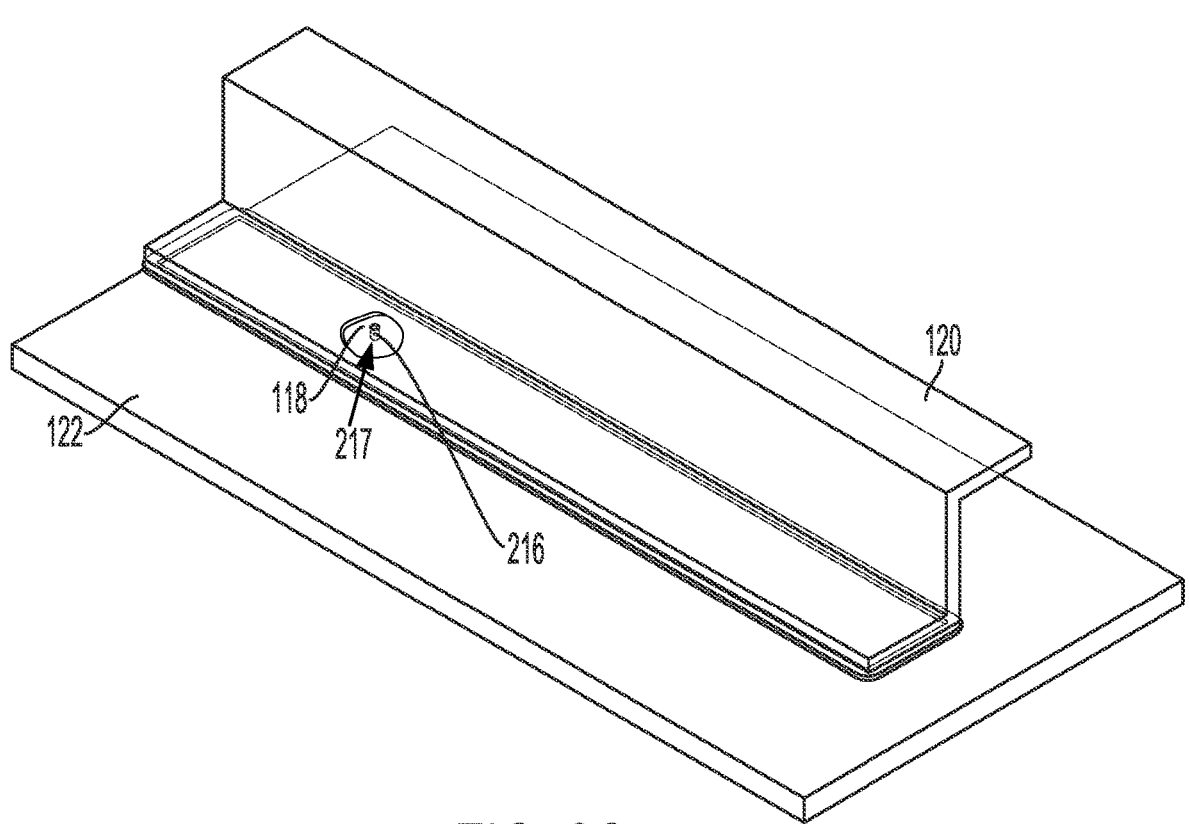

FIG. 3B illustrates a perspective view of an initial stage in the process. In the initial stage, the bond gap repair area 118 is located. As discussed above, in some situations the bond gap repair area 118 is a bondline void that is repaired using the process. The bond gap repair area 118 can be located using various methods, such as non-destructive evaluation (e.g., ultrasonic testing). In FIGS. 3B and 3C, part of the first structure 120 is transparent so as to illustrate the bond gap repair area 118.

Figure 3D:
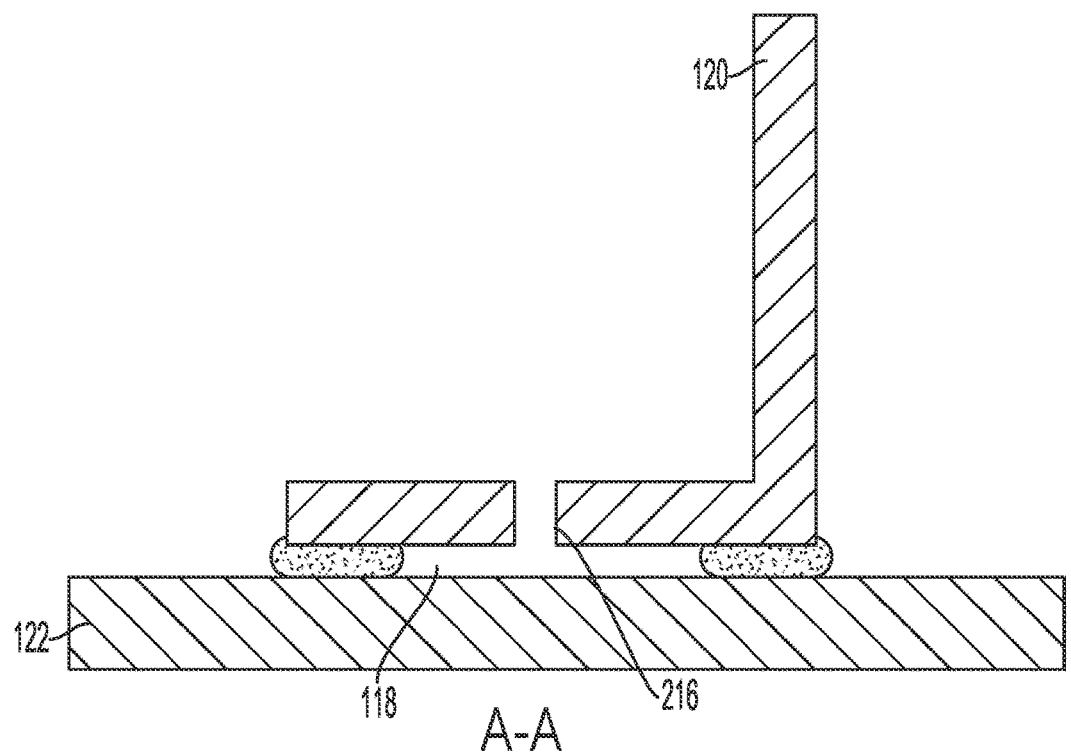

FIG. 3C and FIG. 3D illustrate a perspective view and a cross-sectional view (taken along A-A shown in FIG. 3A), respectively, of a next stage in which the single hole 216 is formed in the first structure 120 to access the bond gap repair area 118 between the first structure 120 and the second structure 122. In an example, the single hole 216 is formed at a location proximate to a geometric center 217 of the bond gap repair area 118 to help the adhesive 205 completely fill the bond gap repair area 118. The geometric center can be mapped and estimated using non-destructive evaluation, or by using other techniques. Selecting the location of and forming the single hole can be less complex and time consuming than conventional methods involving selecting locations of and forming multiple holes.

FIGS. 3E-3L illustrate cross-sectional views of the first structure 120 and the second structure 122 taken along line A-A shown in FIG. 3A.

Figure 3E:
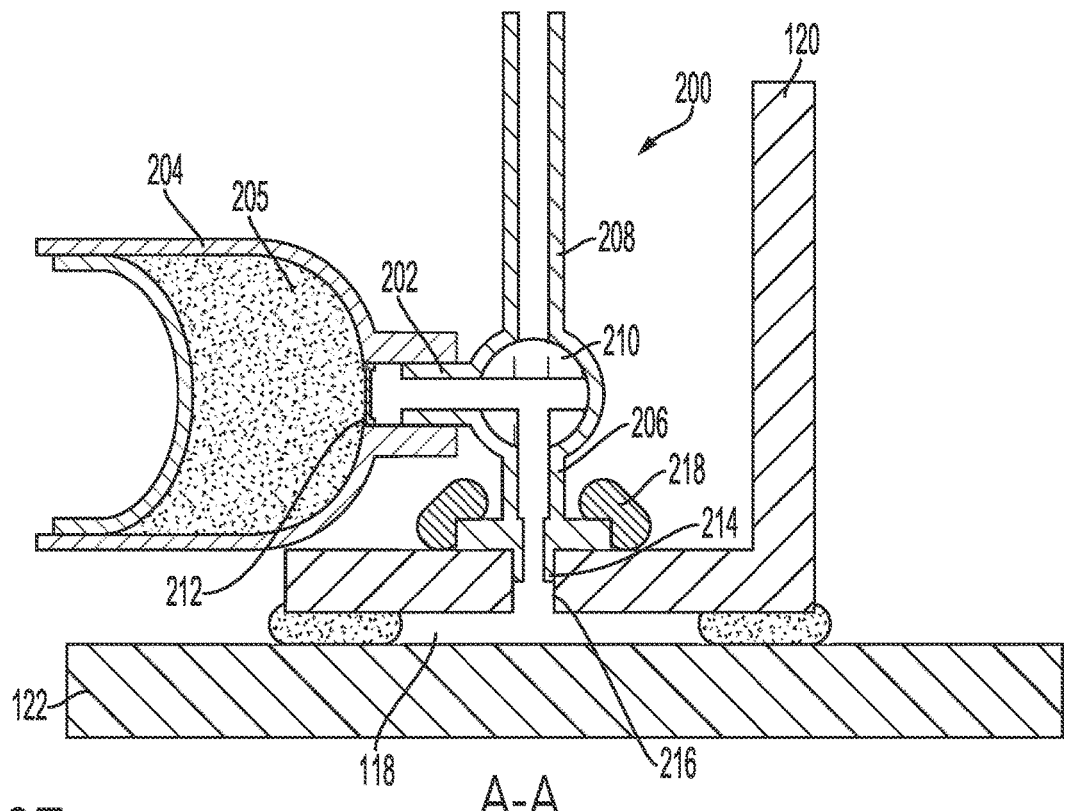

FIG. 3E illustrates a cross-sectional view of a next stage in which the adhesive injection apparatus 200 is attached to the single hole 216. As noted above, the vacuum seal tape 218 can be used to assist attaching the adhesive injection apparatus 200 to the single hole 216.

Figure 3F:
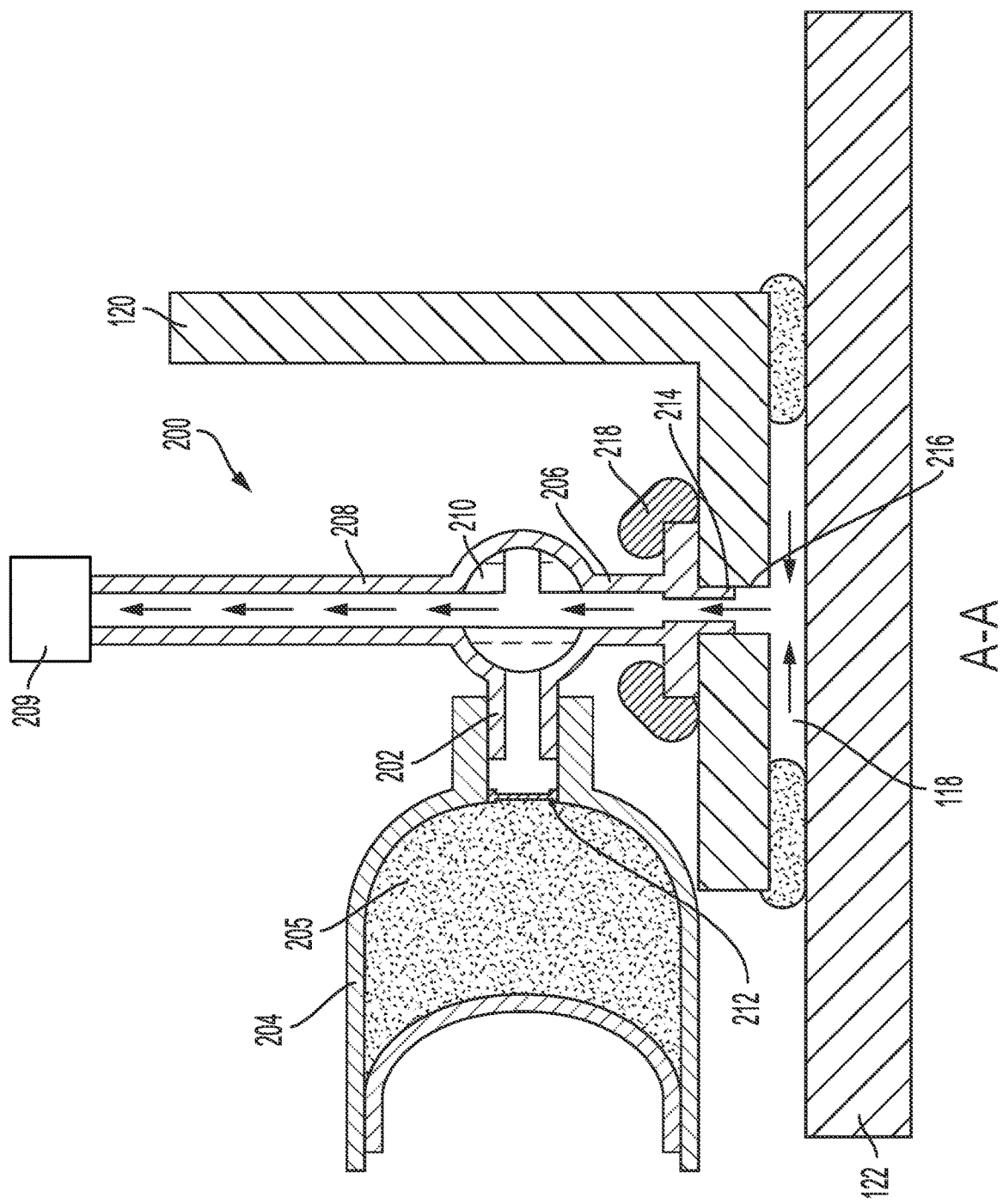

FIG. 3F illustrates a cross-sectional view of a next stage in which the adhesive injection apparatus 200 is used to evacuate the bond gap repair area 118 and the injection channel 206 of the adhesive injection apparatus 200. To facilitate this, the three-way valve 210 can be positioned as shown in FIG. 3F to establish fluid communication between the evacuation channel 208 and the injection channel 206, thus allowing for the vacuum source 209 to be turned on and used to evacuate the injection channel 206 and the bond gap repair area 118. Arrows are shown to illustrate air drawn out of the injection channel 206 and the bond gap repair area 118. In one example, the position of the three-way valve 210 can be changed manually by a human operator. In another example, the position of the three-way valve 210 can be changed by a robotic device.

Figure 3G:
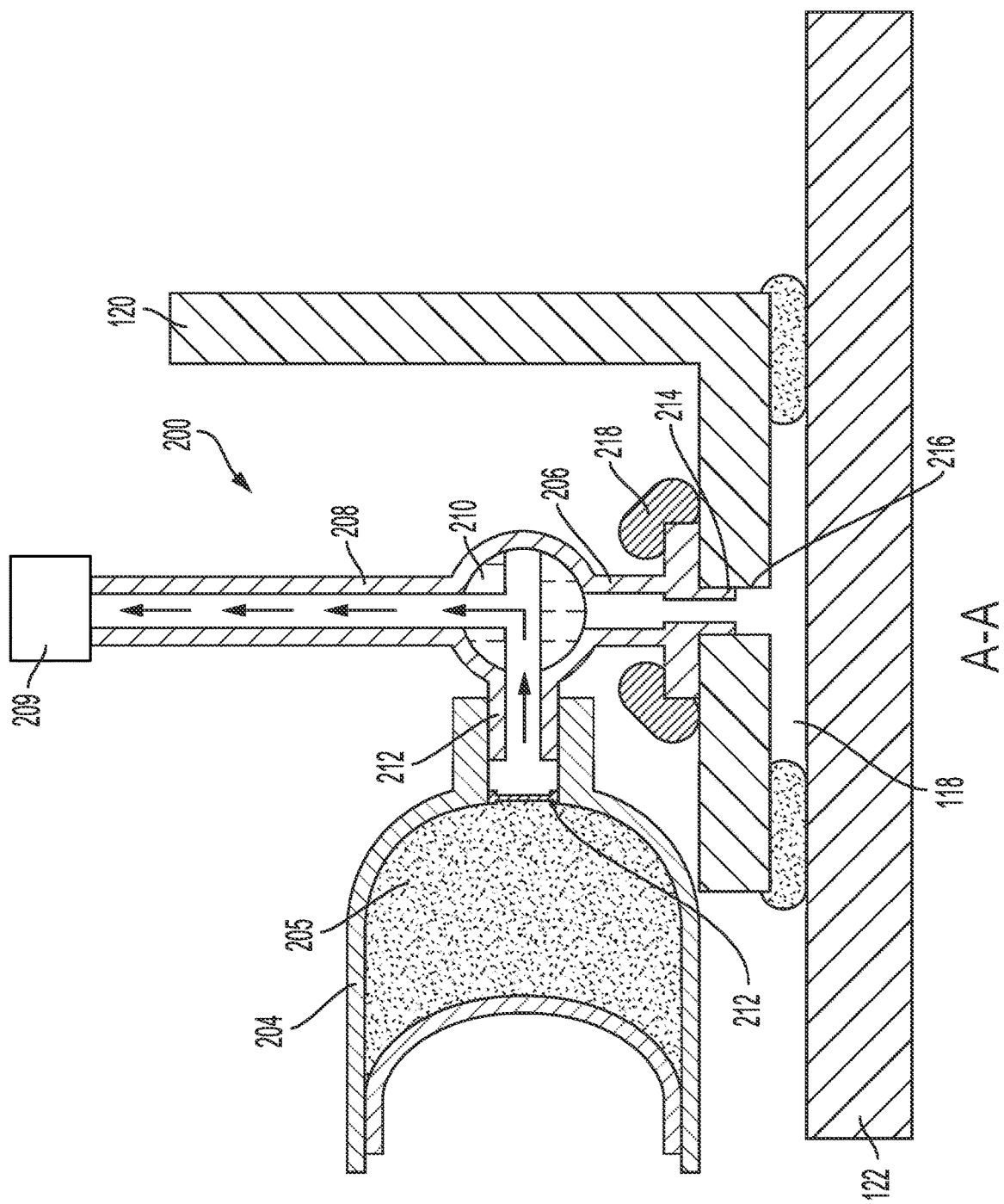

FIG. 3G illustrates a cross-sectional view of a next stage in which the adhesive injection apparatus 200 is used to evacuate the transfer channel 202 of the adhesive injection apparatus 200. To facilitate this, after evacuating the bond gap repair area 118, the three-way valve 210 can then be positioned as shown in FIG. 3G to establish fluid communication between the evacuation channel 208 and the transfer channel 202 and the vacuum source 209 can be turned on to evacuate the transfer channel 202. Arrows are shown to illustrate air drawn out of the transfer channel 202.

Alternatively, the three-way valve 210 can be positioned (i.e., rotated approximately 90 degrees counterclockwise from the position shown in FIG. 3G) to establish fluid communication between the evacuation channel 208, the injection channel 206, and the transfer channel 202, thus allowing for the vacuum source 209 to be turned on and used to evacuate the injection channel 206, the transfer channel 202, and the bond gap repair area 118 at substantially the same time.

Figure 3H:
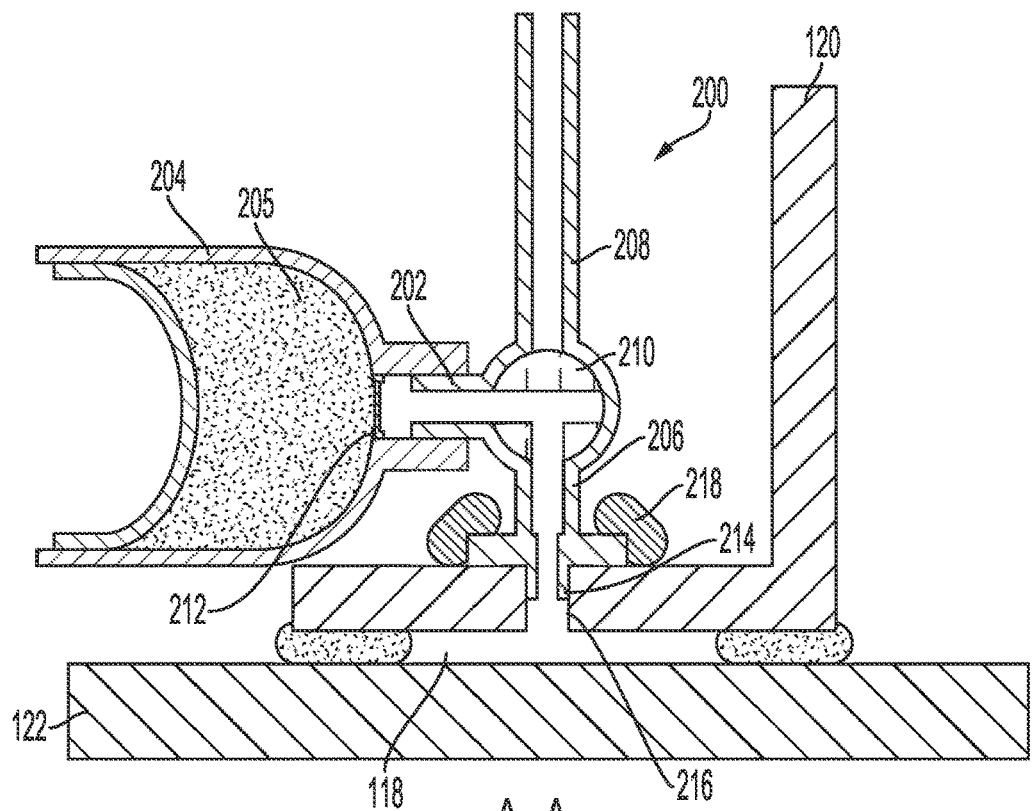

FIG. 3H illustrates a cross-sectional view of a next stage in which the adhesive injection apparatus 200 is prepared for injecting the adhesive 205 into the bond gap repair area 118 by positioning the three-way valve 210 to establish fluid communication between the evacuated transfer channel 202 and the evacuated injection channel 206.

Figure 3I:
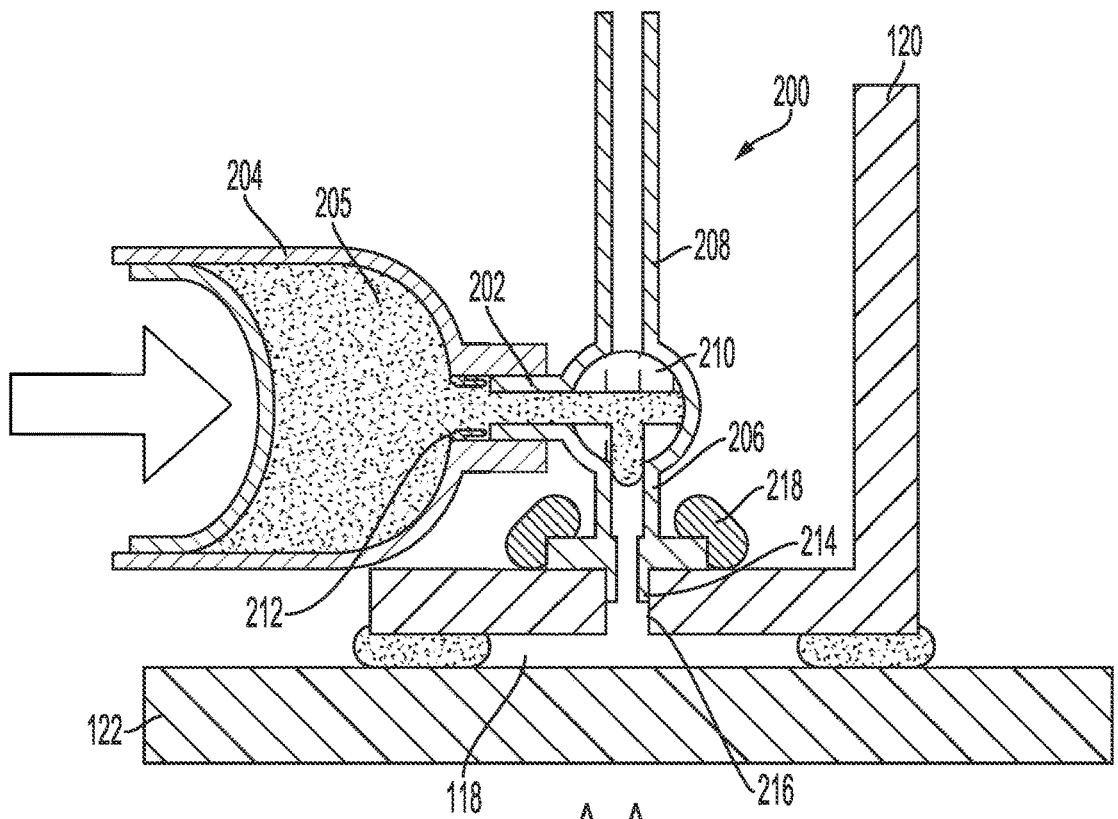
Figure 3J:
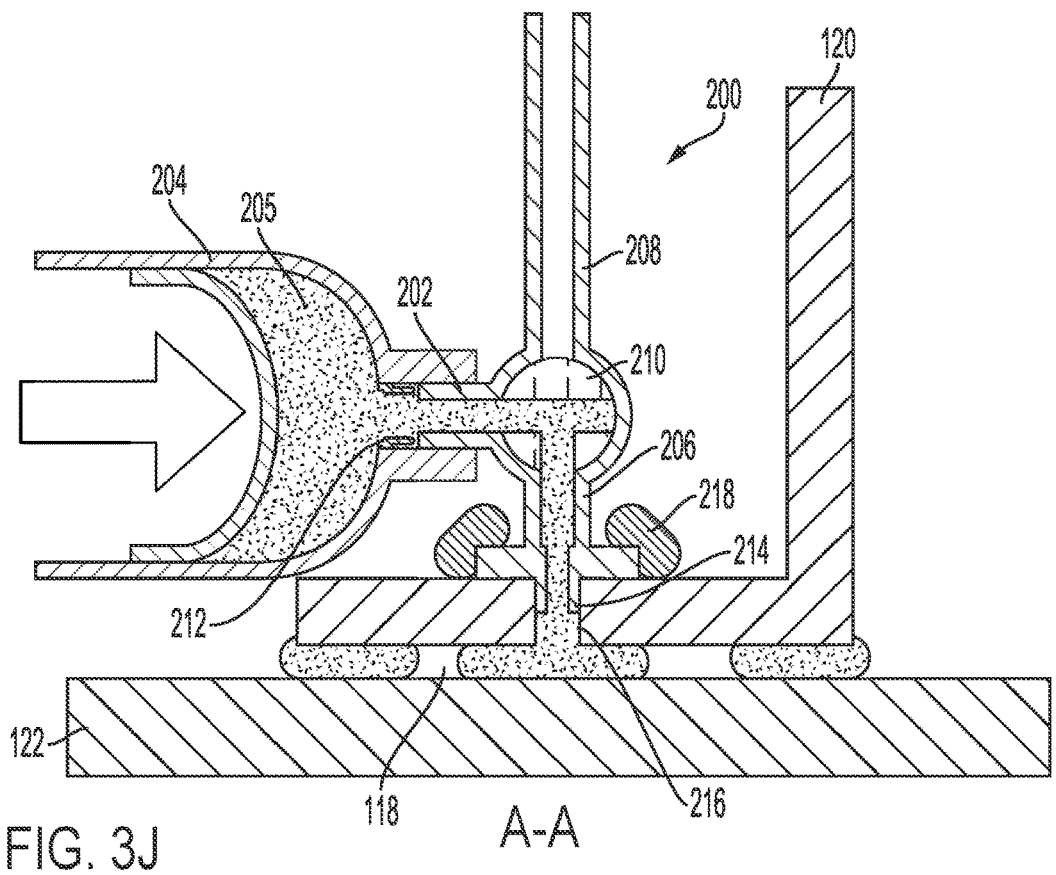
Figure 3K:
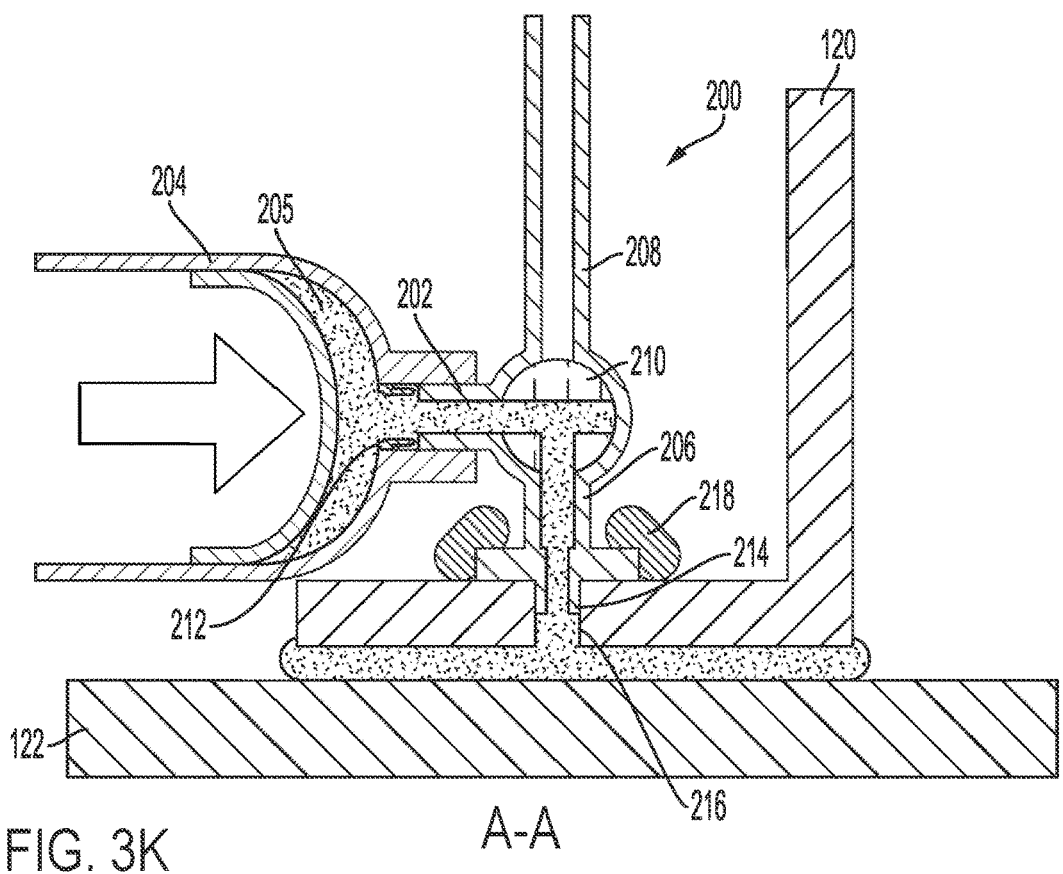

FIG. 3I illustrates a cross-sectional view of a next stage in which the adhesive 205 is forced out of the adhesive reservoir 204, breaking the frangible seal 212, into the evacuated transfer channel 202, and then into the evacuated injection channel 206. An arrow is shown in FIGS. 3I-3K to illustrate pressure placed on the adhesive reservoir 204, thus forcing the adhesive 205 out of the adhesive reservoir 204. In one example, the pressure is applied manually by a human operator. In another example, the pressure is applied by a robotic device.

FIG. 3J illustrates a cross-sectional view of a next stage in which the adhesive 205 enters the evacuated bond gap repair area 118 and begins to fill the evacuated bond gap repair area 118.

FIG. 3K illustrates a cross-sectional view of a next stage in which the adhesive 205 fills the evacuated bond gap repair area 118. The adhesive 205 has no air and, when the adhesive 205 is injected into the evacuated bond gap repair area 118, no voids or trapped air bubbles will be present, since no air was present in the evacuated bond gap repair area 118 to resist the adhesive 205 filling the evacuated bond gap repair area 118. The resulting bondline is a voidfree bondline, for example.

Figure 3L:
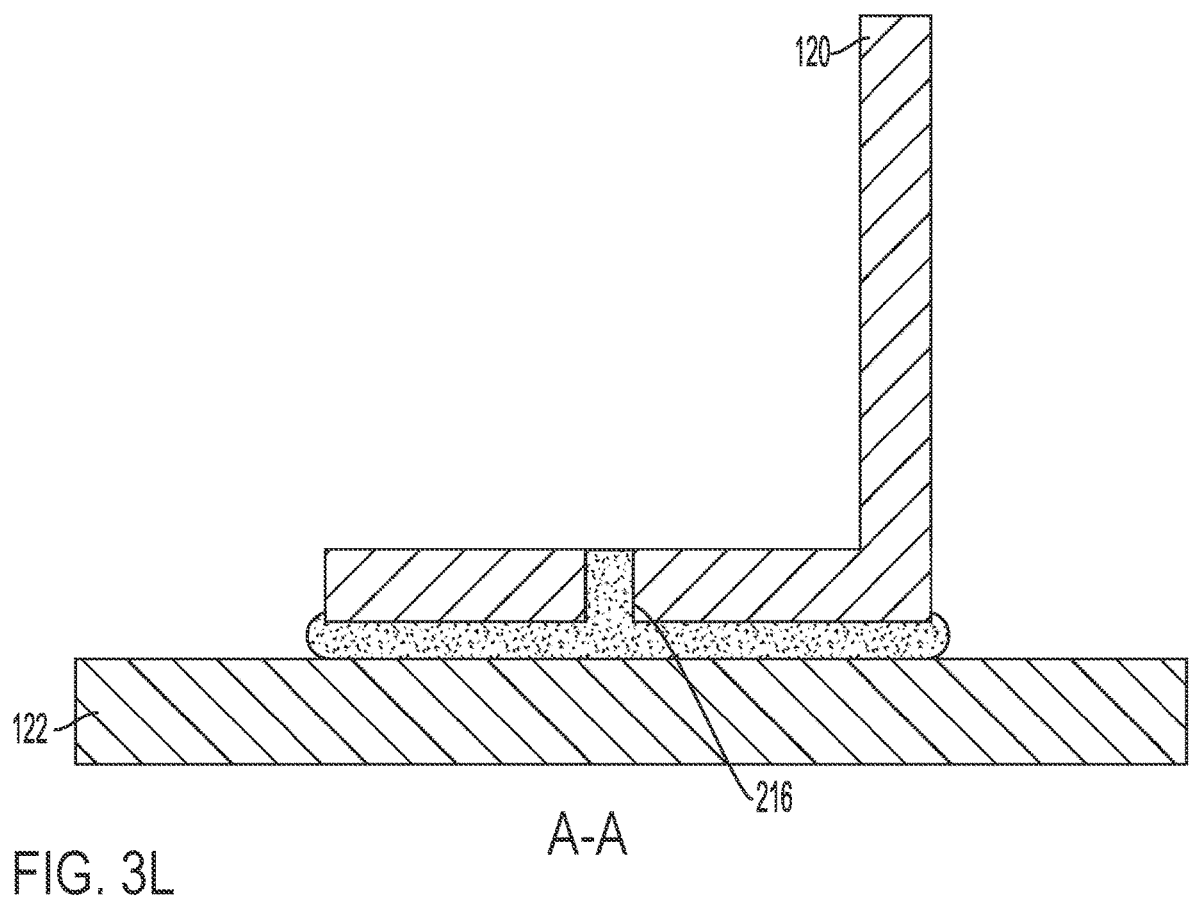

FIG. 3L illustrates a cross-sectional view of a next stage in which the adhesive injection apparatus 200 has been detached from the single hole 216, a remaining portion of the adhesive 205 protruding from the single hole 216 (if any such portion remains) has been removed, and the adhesive 205 has been cured to form a bondline in the bond gap repair area 118.

In one example, the act of curing the adhesive 205 is performed while the adhesive injection apparatus 200 is still attached to the single hole 216. In another example, the act of curing the adhesive 205 is performed after the adhesive injection apparatus 200 is detached from the single hole 216. To facilitate curing of the adhesive 205, the adhesive 205 is heated. Various forms of heating can be used to cure the adhesive 205 including, but not limited to, conductively heating the adhesive 205 with a resistance heat blanket (not shown), radiantly heating the adhesive 205 with a heat lamp (not shown), convectively heating the adhesive 205 with forced air (not shown), and/or inductively heating the adhesive 205 with metallic elements (not shown) embedded in at least the first structure 120. Alternatively, the adhesive 205 may be an adhesive that cures at room temperature, and thus another technique for heating/curing might not be needed.

The act of removing the remaining portion of the adhesive 205 protruding from the single hole 216 is optional and can be performed, for instance, by using a blade or sander to trim or sand-down any adhesive 205 that protrudes from the single hole 216. The act of curing the adhesive 205 is optional in some examples as well.

In some situations, the adhesive 205 might begin to push the injection tip 214 out of the single hole 216 once the bond gap repair area 118 is filled.

Figure 3M:
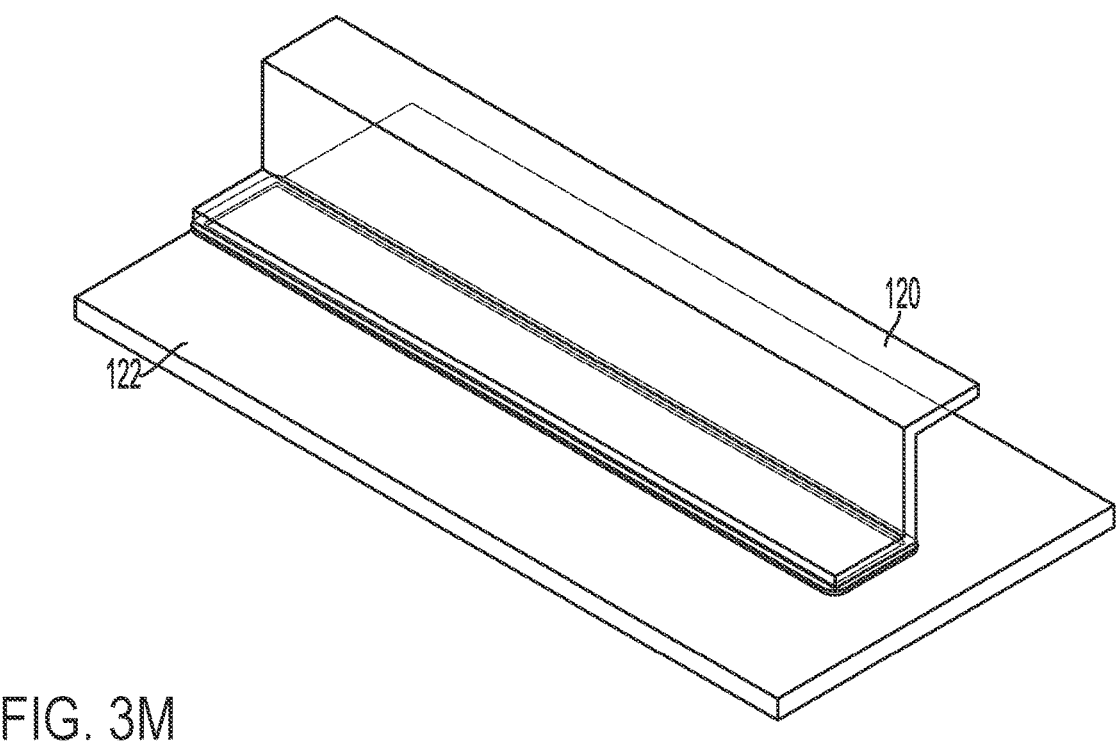

FIG. 3M illustrates a perspective view of the first structure 120 and the second structure 122, having a bondline formed by the process described above. In some examples, non-destructive inspection, such as ultrasonic inspection or thermographic inspection, can be used to ensure complete void fill.

In some examples, such as those illustrated in FIGS. 3A-3M, the bond gap repair area 118 between the first structure 120 and the second structure 122 has a perimeter defined by an adhesive (e.g., the same type of adhesive as the adhesive 205, or a different type). Within examples, the bond gap repair area 118 can be considered a bond gap area. In other examples, the perimeter of a bond gap area is defined by a sealant bead that is placed around the perimeter of the first structure 120 and/or the second structure 122 to seal the bond gap area. As a more particular example, the first structure 120 can be fastened to the second structure 122, and then an injection nozzle or other applicator can be used to place the sealant bead around the perimeter of the first structure 120 to seal the bond gap area. Other examples are possible as well.

FIG. 4 illustrates a representative example stage in a process similar to the process described above, where a bond gap area 118' is evacuated and the adhesive 205 is thereafter forced into the bond gap area 118', specifically in a scenario where a sealant bead 220 defines a perimeter of the bond gap area 118'. More particularly, FIG. 4 illustrates a stage in which the bond gap area 118' is evacuated at substantially the same time as the injection channel 206 and the transfer channel 202, as shown by the arrows and the positioning of the three-way valve 210. To facilitate this, as further shown, the adhesive injection apparatus 200 is attached to the single hole 216 formed in the first structure 120 via a fastener 222 that includes a through-hole that allows access to the bond gap area 118'. Alternatively, in some scenarios, a fastener might not be present and the adhesive injection apparatus 200 is attached to the single hole 216 in another manner. After the injection channel 206, the transfer channel 202, and the bond gap area 118' are evacuated, the adhesive 205 can be forced out of the adhesive reservoir 204, through the evacuated transfer channel 202 and evacuated injection channel 206, and into the bond gap area 118' to fill up the bond gap area 118' defined by the sealant bead 220 perimeter.

Figure 5:
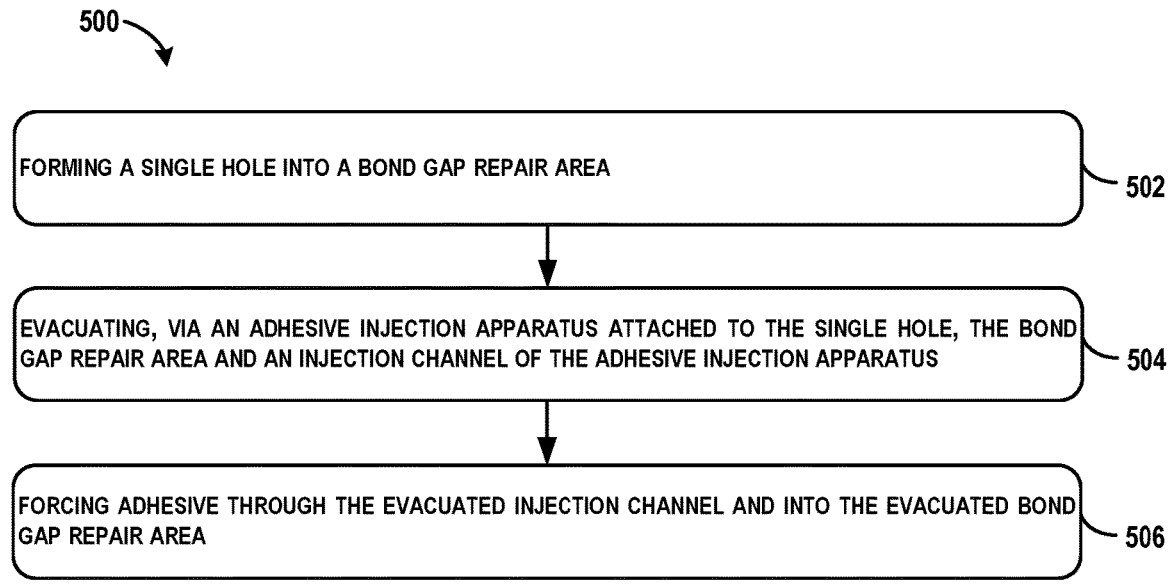
FIG. 5 shows a flowchart of an example method for repair of a bondline void, according to an example implementation.

FIG. 5 shows a flowchart of an example of a method 500 that could be used with the system 100 shown in FIGS. 1-2, or with components thereof. Further, the functions described with respect to FIG. 5 may be supplemented by, replaced by, or combined with functions and phases described above with respect to FIGS. 3A-3M, for example. Further, devices or systems may be used or configured to perform logical functions presented in FIG. 5. Method 500 may include one or more operations, functions, or actions as illustrated by one or more of blocks 502-506.

At block 502, the method 500 includes forming a single hole 216 into a bond gap repair area 118.

At block 504, the method 500 includes evacuating, via an adhesive injection apparatus 200 attached to the single hole 216, the bond gap repair area 118 and an injection channel 206 of the adhesive injection apparatus 200.

At block 506, the method 500 includes forcing adhesive 205 through the evacuated injection channel 206 and into the evacuated bond gap repair area 118.

It should be understood that the adhesive injection apparatus 200 200 shown in FIGS. 3A-3M and FIG. 4 is shown as an example apparatus that could be used to perform at least the operations depicted in block 504 and block 506, and that other apparatuses and/or techniques could alternatively be used to perform at least those operations.

Figure 6:
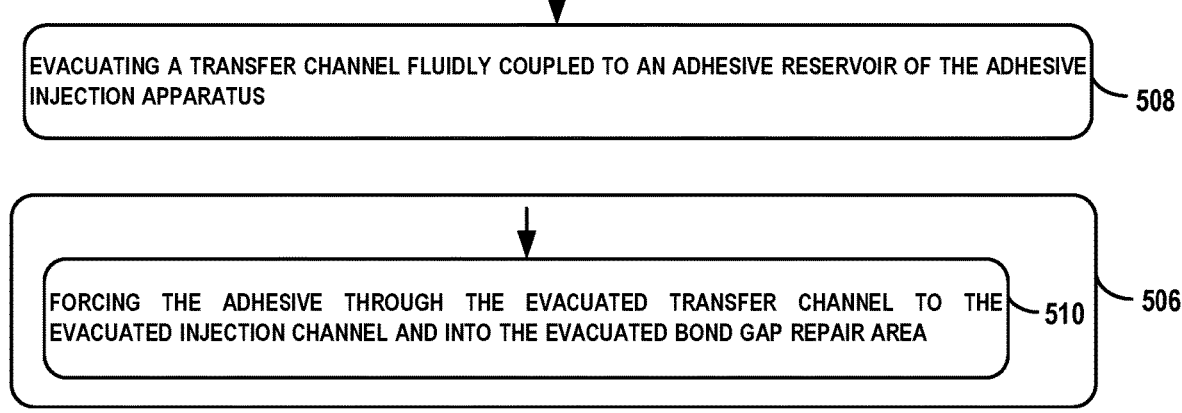
FIG. 6 shows a flowchart of an example method for use with the method of FIG. 5, as well as an example method for performing the forcing function of the method of FIG. 5, according to an example implementation.

FIG. 6 shows a flowchart of an example method for use with the method 500. At block 508, functions include evacuating a transfer channel 202 fluidly coupled to an adhesive reservoir 204 of the adhesive injection apparatus 200. FIG. 6 also shows a flowchart of an example method for performing the forcing as shown in block 506. At block 510, functions include forcing the adhesive 205 through the evacuated transfer channel 202 to the evacuated injection channel 206 and into the evacuated bond gap repair area 118.

Figure 7:
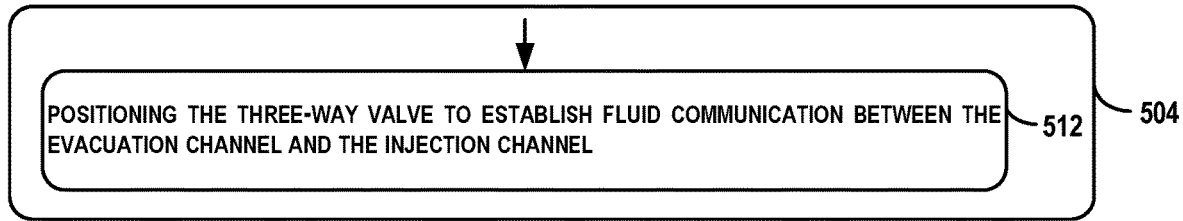
FIG. 7 shows a flowchart of an example method for performing the evacuating function of the method of FIG. 5, according to an example implementation.

FIG. 7 shows a flowchart of an example method for performing the evacuating as shown in block 504, particularly where the adhesive injection apparatus 200 comprises a three-way valve 210 fluidly coupled to the transfer channel 202, the injection channel 206 that is coupled to the bond gap repair area 118, and an evacuation channel 208 that is coupled to a vacuum source 209. At block 512, functions include positioning the three-way valve 210 to establish fluid communication between the evacuation channel 208 and the injection channel 206.

Figure 8:
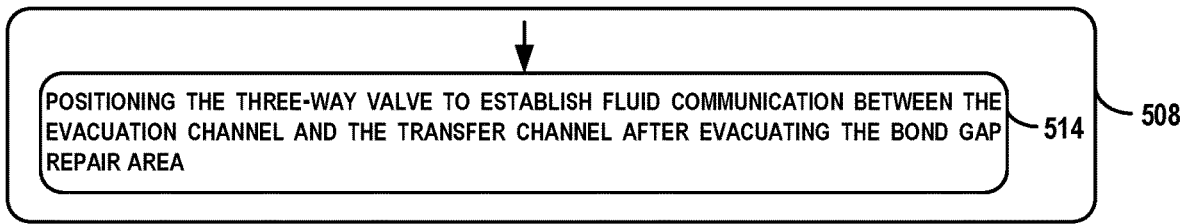
FIG. 8 shows a flowchart of an example method for performing the evacuating function of the method of FIG. 6, according to an example implementation.

FIG. 8 shows a flowchart of an example method for performing the evacuating as shown in block 508. At block 514, functions include positioning the three-way valve 210 to establish fluid communication between the evacuation channel 208 and the transfer channel 202 after evacuating the bond gap repair area 118.

Figure 9:
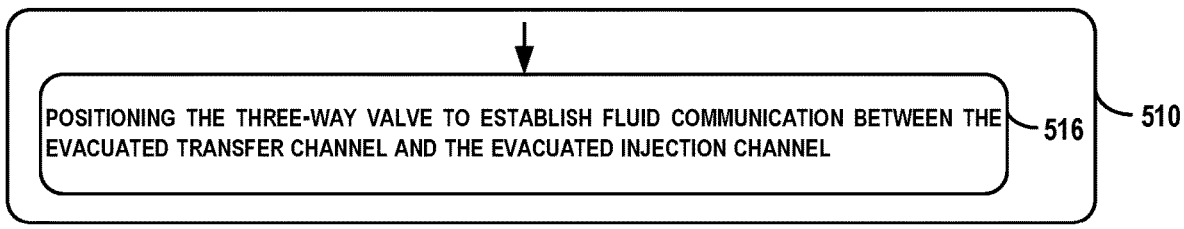
FIG. 9 shows a flowchart of an example method for performing the forcing function of the method of FIG. 6, according to an example implementation.

FIG. 9 shows a flowchart of an example method for performing the forcing as shown in block 510. At block 516, functions include positioning the three-way valve 210 to establish fluid communication between the evacuated transfer channel 202 and the evacuated injection channel 206.

Figure 10:
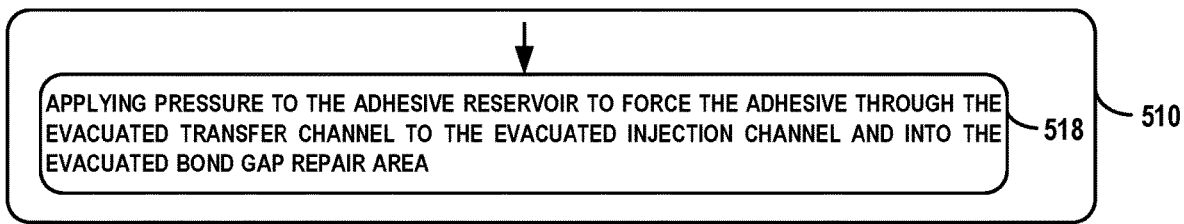
FIG. 10 shows a flowchart of an example method for performing the forcing function of the method of FIG. 6, according to an example implementation.

FIG. 10 shows a flowchart of an example method for performing the forcing as shown in block 510, particularly where the adhesive injection apparatus 200 further comprises an adhesive reservoir 204 fluidly coupled to the transfer channel 202 and containing the adhesive 205. At block 518, functions include applying pressure to the adhesive reservoir 204 to force the adhesive 205 through the evacuated transfer channel 202 to the evacuated injection channel 206 and into the evacuated bond gap repair area 118. In some embodiments, the function of applying pressure is performed in addition to (e.g., after) positioning the three-way valve 210 to establish fluid communication between the evacuated transfer channel 202 and the evacuated injection channel 206 as shown in block 516.

Figure 11:
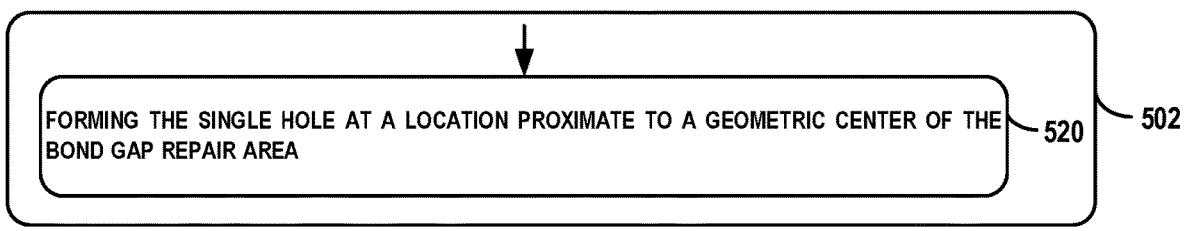
FIG. 11 shows a flowchart of an example method for performing the forming function of the method of FIG. 5, according to an example implementation.

FIG. 11 shows a flowchart of an example method for performing the forming as shown in block 502. At block 520, functions include forming the single hole 216 at a location proximate to a geometric center 217 of the bond gap repair area 118.

Figure 12:
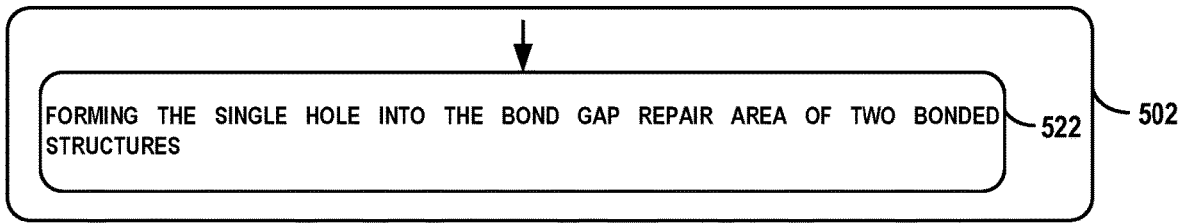
FIG. 12 shows a flowchart of an example method for performing the forming function of the method of FIG. 5, according to an example implementation.

FIG. 12 shows a flowchart of an example method for performing the forming as shown in block 502. At block 522, functions include forming the single hole 216 into the bond gap repair area 118 of two bonded structures. In an example, the two bonded structures are the first structure 120 and the second structure 122.

Figure 13:
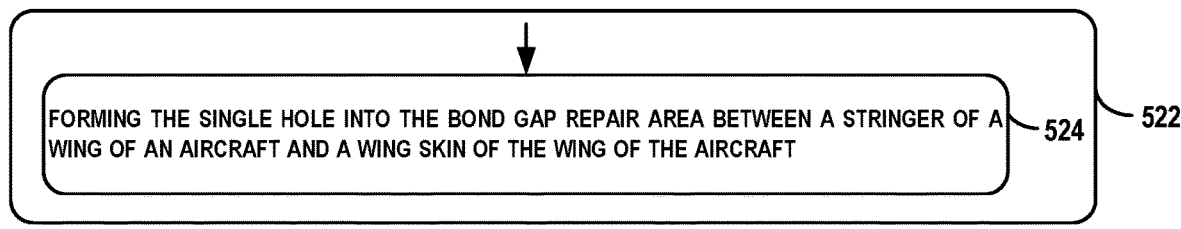
FIG. 13 shows a flowchart of an example method for performing the forming function of the method of FIG. 12, according to an example implementation.

FIG. 13 shows a flowchart of an example method for performing the forming as shown in block 522. At block 524, functions include forming the single hole 216 into the bond gap repair area 118 between a stringer of a wing 102 of the aircraft 104 and a wing skin 116 of the wing 102 of the aircraft 104. In an example, the stringer is one of the longerons 112 shown in FIG. 1A.

Figure 14:
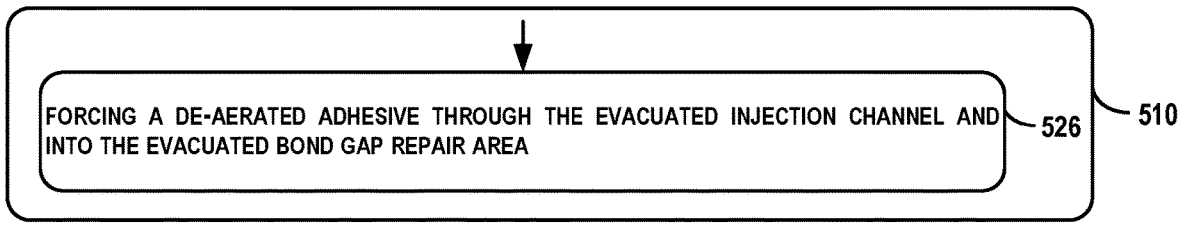
FIG. 14 shows a flowchart of an example method for performing the forcing function of the method of FIG. 5, according to an example implementation.

FIG. 14 shows a flowchart of an example method for performing the forcing as shown in block 506. At block 526, functions include forcing a de-aerated adhesive through the evacuated injection channel 206 and into the evacuated bond gap repair area 118.

Figure 15:
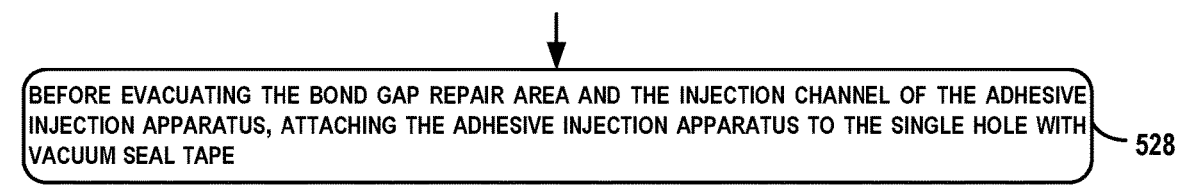
FIG. 15 shows a flowchart of an example method for use with the method of FIG. 5, according to an example implementation.

FIG. 15 shows a flowchart of an example method for use with the method 500. At block 528, functions include before evacuating the bond gap repair area 118 and the injection channel 206 of the adhesive injection apparatus 200, attaching the adhesive injection apparatus 200 to the single hole 216 with vacuum seal tape 218.

Figure 16:
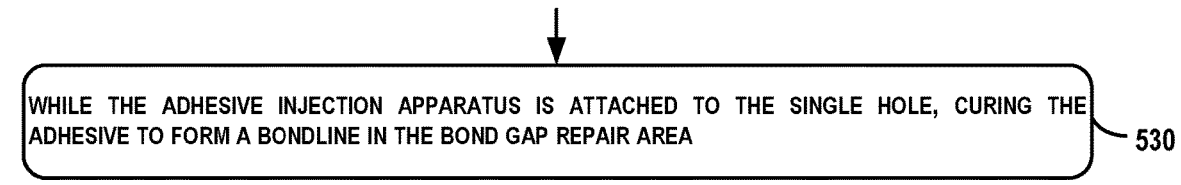
FIG. 16 shows a flowchart of an example method for use with the method of FIG. 5, according to an example implementation.

FIG. 16 shows a flowchart of an example method for use with the method 500. At block 530, functions include while the adhesive injection apparatus 200 is attached to the single hole 216, curing the adhesive 205 to form a bondline in the bond gap repair area 118.

FIG. 17 shows a flowchart of an example method for use with the method 500. At block 532, functions include after forcing the adhesive 205 through the evacuated injection channel 206 and into the evacuated bond gap repair area 118, detaching the adhesive injection apparatus 200 from the single hole 216 and removing a remaining portion of the adhesive 205 protruding from the single hole 216.

FIG. 18 shows a flowchart of an example method for use with the method 500, particularly the functions shown in block 532. At block 534, functions include curing the adhesive 205 to form a bondline in the bond gap repair area 118.

FIG. 19 shows a flowchart of an example of a method 600 that could be used with the system 100 shown in FIGS. 1-2, or with components of thereof. Further, the functions described with respect to FIG. 6 may be supplemented by, replaced by, or combined with functions and phases described above with respect to FIGS. 3A-3M and FIG. 4, for example. Further, devices or systems may be used or configured to perform logical functions presented in FIG. 19. Method 600 may include one or more operations, functions, or actions as illustrated by one or more of blocks 602-606.

At block 602, functions include forming a single hole 216 into a bond gap area 118'.

At block 604, functions include evacuating, via an adhesive injection apparatus 200 attached to the single hole 216, the bond gap area 118' and an injection channel 206 of the adhesive injection apparatus 200.

At block 606, functions include forcing adhesive 205 through the evacuated injection channel 206 and into the evacuated bond gap area 118'.

FIG. 20 shows a flowchart of an example method for use with the method 600, particularly where the bond gap area 118' is a bond gap area between a first structure 120 and a second structure 122. At block 608, functions include placing a sealant bead 220 around a perimeter of the first structure 120 to seal the bond gap area 118'.

In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 500 and method 600 each include one or more operations, functions, or actions as illustrated by one or more of blocks 502-506 and 602-606, respectively. Further, blocks of FIGS. 6-18 may be performed in accordance with one or more of block 502-506, and blocks of FIG. 20 may be performed in accordance with one or more of block 602-606. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Within examples, one or more blocks of method 500 or method 600 may be represented in program code or circuitry used for controlling robotic mechanisms for evacuated injection repair of bondline voids and/or filling a bond gap area with adhesive (e.g., during assembly of a bonded structure and/or a wing including a plurality of bonded structures). While method 500 or method 600 and variations thereof may be executed automatically using, for example, one or more robotic armatures controlled by program code operating in accordance with method 500 or method 600, some tasks may be performed manually. Thus, within examples, certain functionality described with respect to method 500 or method 600 may be performed automatically while other portions can be performed manually. Alternatively, all blocks of method 500 or method 600 may be performed automatically or all blocks of method 500 or method 600 may be performed manually.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method comprising:
forming a single hole into a bond gap repair area;
evacuating, via an adhesive injection apparatus attached to the single hole, the bond gap repair area and an injection channel of the adhesive injection apparatus; and
forcing adhesive through the evacuated injection channel and into the evacuated bond gap repair area.

2. The method of claim 1, further comprising:
evacuating a transfer channel fluidly coupled to an adhesive reservoir of the adhesive injection apparatus,
wherein forcing the adhesive through the evacuated injection channel and into the evacuated bond gap repair area comprises forcing the adhesive through the evacuated transfer channel to the evacuated injection channel and into the evacuated bond gap repair area.

3. The method of claim 2, wherein:
the adhesive injection apparatus comprises a three-way valve fluidly coupled to the transfer channel, the injection channel that is coupled to the bond gap repair area, and an evacuation channel that is coupled to a vacuum source, and
evacuating the bond gap repair area comprises positioning the three-way valve to establish fluid communication between the evacuation channel and the injection channel.

4. The method of claim 3, wherein evacuating the transfer channel comprises positioning the three-way valve to establish fluid communication between the evacuation channel and the transfer channel after evacuating the bond gap repair area.

5. The method of claim 4, wherein forcing the adhesive through the evacuated transfer channel to the evacuated injection channel and into the evacuated bond gap repair area comprises positioning the three-way valve to establish fluid communication between the evacuated transfer channel and the evacuated injection channel.

6. The method of claim 5, wherein:
the adhesive injection apparatus further comprises an adhesive reservoir fluidly coupled to the transfer channel and containing the adhesive, and
forcing the adhesive through the evacuated transfer channel to the evacuated injection channel and into the evacuated bond gap repair area further comprises applying pressure to the adhesive reservoir to force the adhesive through the evacuated transfer channel to the evacuated injection channel and into the evacuated bond gap repair area.

7. The method of claim 1, wherein forming the single hole into the bond gap repair area comprises forming the single hole at a location proximate to a geometric center of the bond gap repair area.

8. The method of claim 1, wherein forming the single hole into the bond gap repair area comprises forming the single hole into the bond gap repair area of two bonded structures.

9. The method of claim 8, wherein forming the single hole into the bond gap repair area of the two bonded structures comprises forming the single hole into the bond gap repair area between a stringer of a wing of an aircraft and a wing skin of the wing of the aircraft.

10. The method of claim 1, wherein forcing the adhesive through the evacuated injection channel and into the evacuated bond gap repair area comprises forcing a de-aerated adhesive through the evacuated injection channel and into the evacuated bond gap repair area.

11. The method of claim 1, further comprising:
before evacuating the bond gap repair area and the injection channel of the adhesive injection apparatus, attaching the adhesive injection apparatus to the single hole with vacuum seal tape.

12. The method of claim 1, further comprising:
while the adhesive injection apparatus is attached to the single hole, curing the adhesive to form a bondline in the bond gap repair area.

13. The method of claim 1, further comprising:
after forcing the adhesive through the evacuated injection channel and into the evacuated bond gap repair area:
detaching the adhesive injection apparatus from the single hole; and
removing a remaining portion of the adhesive protruding from the single hole.

14. The method of claim 13, further comprising:
curing the adhesive to form a bondline in the bond gap repair area.

15. A method comprising:
forming a single hole into a bond gap area;
evacuating, via an adhesive injection apparatus attached to the single hole, the bond gap area and an injection channel of the adhesive injection apparatus; and
forcing adhesive through the evacuated injection channel and into the evacuated bond gap area.

16. The method of claim 15, wherein the bond gap area is a bond gap area between a first structure and a second structure, the method further comprising:
placing a sealant bead around a perimeter of the first structure to seal the bond gap area.

17. The method of claim 15, further comprising:
evacuating a transfer channel fluidly coupled to an adhesive reservoir of the adhesive injection apparatus,
wherein forcing the adhesive through the evacuated injection channel and into the evacuated bond gap area comprises forcing the adhesive through the evacuated transfer channel to the evacuated injection channel and into the evacuated bond gap area.

18. The method of claim 17, wherein:
the adhesive injection apparatus comprises a three-way valve fluidly coupled to the transfer channel, the injection channel that is coupled to the bond gap area, and an evacuation channel that is coupled to a vacuum source, and
evacuating the bond gap area comprises positioning the three-way valve to establish fluid communication between the evacuation channel and the injection channel.

19. The method of claim 18, wherein evacuating the transfer channel comprises positioning the three-way valve to establish fluid communication between the evacuation channel and the transfer channel after evacuating the bond gap area.

20. The method of claim 18, wherein forcing the adhesive through the evacuated transfer channel to the evacuated injection channel and into the evacuated bond gap area comprises:
positioning the three-way valve to establish fluid communication between the evacuated transfer channel and the evacuated injection channel.

* * * * *